United States Patent
Koishikawa et al.

(10) Patent No.: US 6,240,138 B1
(45) Date of Patent: *May 29, 2001

(54) DATA TRANSMITTING APPARATUS

(75) Inventors: Yoshinori Koishikawa; Kazuo Kamiyama, both of Kanagwa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/793,343
(22) PCT Filed: Jun. 19, 1996
(86) PCT No.: PCT/JP96/01699
§ 371 Date: Jun. 13, 1997
§ 102(e) Date: Jun. 13, 1997
(87) PCT Pub. No.: WO97/00577
PCT Pub. Date: Jan. 3, 1997

(30) Foreign Application Priority Data

Jun. 19, 1995 (JP) .................................................. 7-151837

(51) Int. Cl.$^7$ ................................................. H04N 7/00
(52) U.S. Cl. ...................................... 375/240.28; 386/124
(58) Field of Search ............................... 348/845, 845.1, 348/845.2, 845.3, 423.1, 390.1, 384.1, 485; 386/81, 124, 57; 380/10, 20; 370/60; 395/166; 375/240.28

(56) References Cited

U.S. PATENT DOCUMENTS

| | | | |
|---|---|---|---|
| 4,855,827 | * 8/1989 | Best | 348/485 |
| 5,257,254 | * 10/1993 | Kutaragi | 386/57 |

FOREIGN PATENT DOCUMENTS

| | | |
|---|---|---|
| 1-212187 | 8/1989 | (JP) . |
| 6-78270 | 3/1994 | (JP) . |

\* cited by examiner

*Primary Examiner*—Chris Kelley
*Assistant Examiner*—Gims Philippe
(74) *Attorney, Agent, or Firm*—Frommer Lawrence & Haug, LLP; William S. Frommer; Darren M. Simon

(57) ABSTRACT

A data transmitting apparatus 1 of a data transmitting apparatus 10 and a data receiving apparatus 20. The data transmitting apparatus 10 compresses and encodes input data VIN by an inter-frame compression and encoding system etc., stores the same in a payload portion of a transmission packet together with the reproduction-use data indicating the reproduction method when performing the variable speed reproduction on the reception side, and transmits the resultant data to the data receiving apparatus 20. That is, the transmission data to be transmitted such as AV data, and the reproduction-use data required for the variable speed reproduction and other processing are transmitted included in the same transmission packet. The data receiving apparatus 20 separates the compressed AV data and the reproduction-use data from the received SDDI transmission packet, expands and decodes the compressed AV data, and performs the variable speed reproduction of the AV data such as fast forward based on the separated reproduction-use data.

25 Claims, 4 Drawing Sheets

DATA TRANSMITTING APPARATUS

TECHNICAL FIELD

The present invention relates to a data transmitting apparatus (data transmitting system) which performs compression or other predetermined processing on audio and/or video data etc. at a transmitting side and receives and reproduces the transmitted data at the reception side, more particularly, the present invention relates to a data transmitting apparatus which is able to efficiently transmit data audio and/or video data etc. as data for variable speed reproduction at the reception side from the transmitting side to the reception side.

BACKGROUND ART

As a signal transmission system for transmitting audio and/or video data (hereinafter simply referred to as AV data) of a digital format between apparatuses used for video editing etc., a serial digital interface (SDI) system has been used. The signal format of the SDI system has been standardized as SMPTE-295M of the SMPTE (Society of Motion Picture and Television Engineers) as a standard of video signals and audio signals of a digital format.

The SDI system is used in the transmission of the AV data of a digital format of the D1 system, that is, a component video format, and D2 system, that is, a composite video system. The transmission speed thereof is as high as 270 MHz.

In the SDI system, however, the limitation is set that the signal which can be transmitted is only one channel's worth of noncompressed AV data and only eight channels' worth of the audio signal of the base band. At the present time, the SDI system is not necessarily suitable for meeting the demands for multi-media or multi-channels which are now being raised in the field of broadcasting or video editing.

Therefore, recently an SDDI (serial digital data interface) system has been proposed by the Sony Corporation which can transmit a plurality of series of noncompressed AV data, AV data compressed by inter-frame predictive encoding, etc. or computer data and can use the transmission equipment of the conventionally used SDI system to transmit the data.

In a television broadcasting station etc., video equipment such as VTRs and video editing devices used for the editing of videos are connected by a router device etc. AV data of the SDDI system transmitted from any apparatus can be input to any other apparatus via the router device.

In a system in which a large number of video equipment are connected via such a router device (AV server system), there are cases where it is desirable to perform variable speed reproduction changing the speed of reproduction of the AV data at the time of reproduction.

Where such variable speed reproduction is carried out, it is necessary to transmit data indicating the method of reproduction of the AV data from the transmission side of the AV data to the reception side.

For example, where it is intended to make the video equipment on the reception side perform variable speed reproduction for compressed AV data, it is necessary to transfer from the video equipment on the transmission side to the video equipment on the reception side control data concerning the writing control at the time of writing of the AV data after the compressed AV data is subjected to expansion and decoding in the frame memory and concerning the reading control at the time of reading the stored AV data from the frame memory.

However, when the reproduction data indicating the method of reproducing the transmitted AV data such as the transmission data, for example, the AV data, the control data concerning the frame memory, etc. are separately transmitted, there arises a problem in that different equipment become necessary for the transmission of the transmission data and the reproduction data.

Also, when the transmission data and the reproduction data are transmitted via different equipment, there arises a problem that it becomes difficult to establish synchronization between the transmission data and the reproduction data.

DISCLOSURE OF THE INVENTION

An object of the present invention is to provide a data transmitting apparatus which can transmit AV data or other transmission data covered by the transmission and reproduction-use data showing the method of reproduction of the transmitted data, for example, variable speed reproduction, included in the same transmission packet.

Another object of the present invention is to provide a data transmitting apparatus which enables the transmission of the transmission data and the reproduction-use data included in the same transmission packet to enable transmission of these data using the same equipment.

A still other object of the present invention is to provide a data transmitting apparatus which enables the transmission of the transmission data and the reproduction-use included in the same transmission packet to enable easy establishment of synchronization among these data.

The data transmitting apparatus according to the present invention is a data transmitting apparatus which uses a transmission packet having a control portion including at least data for transmission control and a data portion including the transmission data which becomes the object of the transmission to transmit the transmission data from a transmitting apparatus to a receiving apparatus. The transmission apparatus has a reproduction-use data generating means for generating reproduction-use data indicating the method of reproducing the transmission data, a data storing means for storing the reproduction-use data and the transmission data in the transmission packet, and a transmitting means for transmitting the transmission packet storing the reproduction-use data and the transmission data to the receiving apparatus. The receiving apparatus has a receiving means for receiving the transmission packet transmitted by the transmitting apparatus, a data separating means for separating the reproduction-use data and the transmission data from the received transmission packet, and a data reproducing means for reproducing the transmission data based on the reproduction-use data.

For the transmission data, audio and/or video data is suitable.

The data reproducing means of the receiving apparatus has a memory controlling means and a memory means for storing the transmission data separated by the data separating means and outputting the stored transmission data according to the control of the memory controlling means. The reproduction-use data generating means of the transmitting apparatus generates the reproduction-use data indicating the storage region of the memory means in which the transmission data is stored and the storage region of the transmission data to be output from the memory means. The memory controlling means of the data reproducing means of the receiving apparatus sequentially stores the transmission data separated by the data separating means in the storage region of the memory means indicated by the reproduction-use data separated by the data separating means and outputs the transmission data stored in the storage region of the memory means indicated by the reproduction-use data separated by the data separating means.

The data transmitting apparatus according to the present invention is a data transmitting apparatus which transmits transmission data from a transmitting apparatus to a receiving apparatus by using a transmission packet of the SDDI system, that is, a transmission packet having a control portion including the data for the transmission control (ancillary data portion: ANC) and a data portion including the transmission data which is the object of the transmission (payload portion: PAD portion). Here, the data for the transmission control means the horizontal (H) sync, vertical (V) sync, frame sync, and other synchronization signals.

In the transmitting apparatus of the data transmitting apparatus according to the present invention, the reproduction-use data generating means generates the reproduction-use data indicating in which storage region of the frame memory of the receiving apparatus should the transmission data be stored and the transmission data stored in which storage region of the frame memory should be output.

The data storing means stores the reproduction-use data and the transmission data (the noncompressed AV data, the compressed AV data, or computer data) in the transmission packet of the SDDI system.

The transmitting means transmits the transmission packet in which the reproduction-use data and the transmission data are stored by the data storing means to the receiving apparatus via the predetermined transmission channel.

Also, in the receiving apparatus of the data transmitting apparatus according to the present invention, the receiving means receives the transmission packet of the SDDI system transmitted from the predetermined transmission channel by the transmitting apparatus.

The data separating means separates the reproduction-use data and the transmission data from the transmission packet of the SDDI system received by the receiving means.

The data reproducing means performs the processing for expansion and decoding where for example the transmission data is compressed AV data, sequentially stores the transmission data after the expansion and decoding in the storage region of the frame memory designated by the separated reproduction-use data, and sequentially outputs the transmission data after the expansion and decoding stored in the storage region designated by the separated reproduction-use data.

For example, where it is designated that the reproduction-use data be stored in continuous storage regions of the frame memory and that every other frames be output, reproduction at a two times higher speed in the forward direction is carried out. Where where the frames are output in the reverse direction, reproduction in the reverse direction is carried out.

BRIEF DESCRIPTION OF THE DRAWINGS

The above objects and features of the present invention will be more apparent from the following description of the preferred embodiments with reference to the accompanying drawings.

FIG. 2A to FIG. 2C are views of the configuration of the frame of an SDDI system obtained by improving the SDI system standardized as SMPTE-295M so as to be suited for the transmission of compressed data etc., in which FIG. 2A shows the configuration of a frame of the SDDI system;

FIG. 2B shows a transmission packet of the SDDI system; and

FIG. 2C shows a transmission signal of the SDDI system.

BEST MODE FOR CARRYING OUT OF THE INVENTION

First Embodiment

Below, an explanation will be made of a first embodiment of the present invention.

Figure 1:
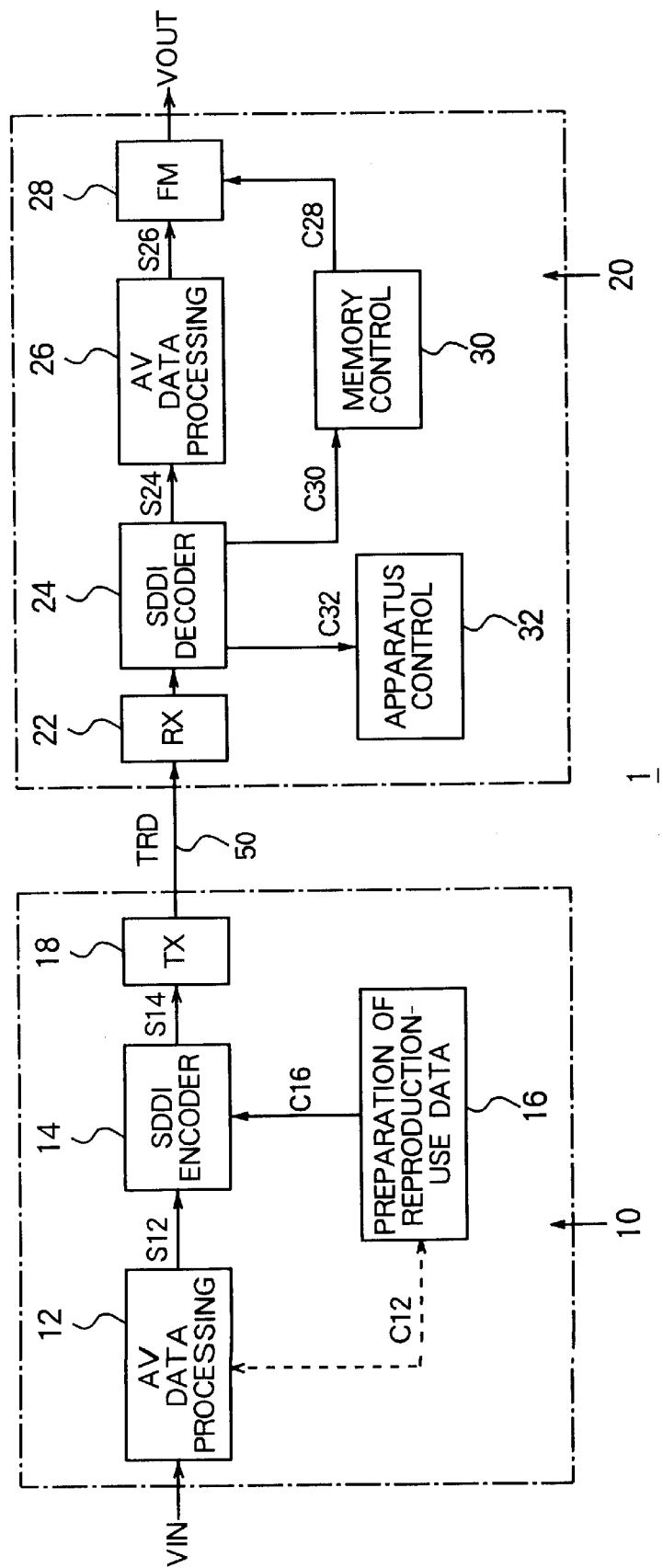
FIG. 1 is a view of the configuration of a data transmitting apparatus according to the present invention.

As shown in FIG. 1, the data transmitting apparatus 1 is configured by a data transmitting apparatus 10 and a data receiving apparatus 20 connected by a predetermined transmission channel 50 suited for a transmission signal of the SDDI system. The data transmitting apparatus 10 is configured by an AV data processing device 12, an SDDI encoder circuit 14, a reproduction-use data generation circuit 16, and a transmission circuit 18. The data receiving apparatus 20 is configured by a reception circuit 22, an SDDI decoder 24, an AV data processing circuit 26, a frame memory 28, a memory control circuit 30, and an apparatus control circuit 32.

Here, before the explanation of the constituent portions of the data transmitting apparatus 1, an explanation will be made of the configuration of a frame of the SDDI system, the configuration of a transmission packet, and the transmission signal.

Figure 2A:
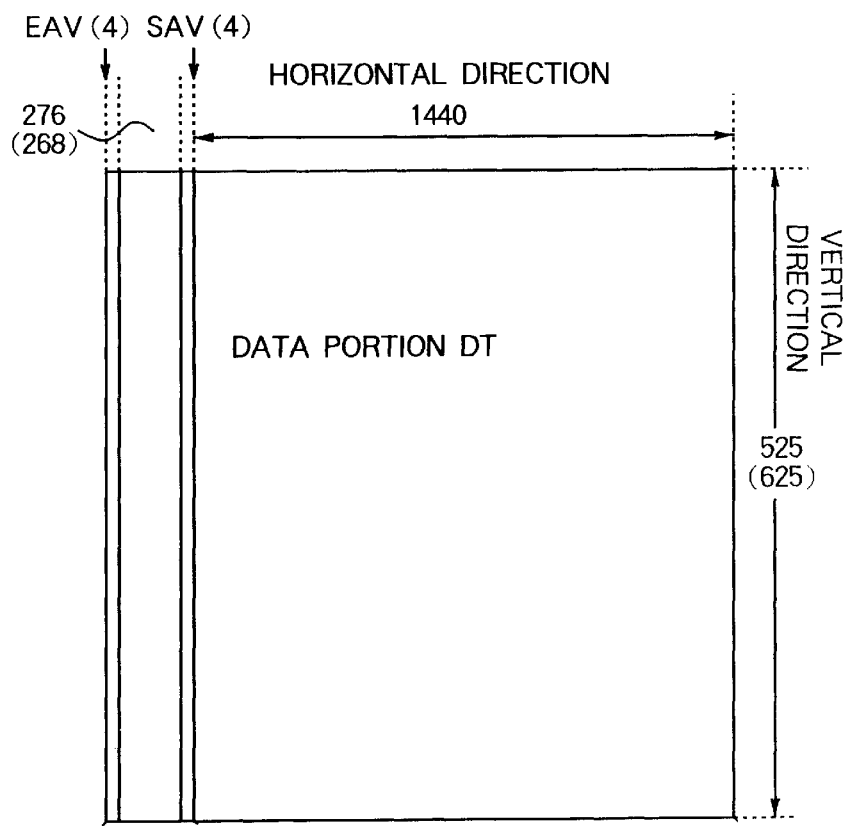
Figure 2B:
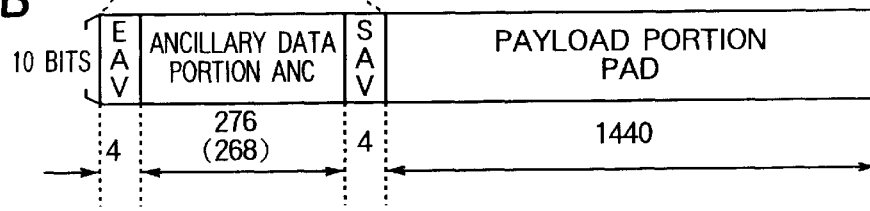
Figure 2C:
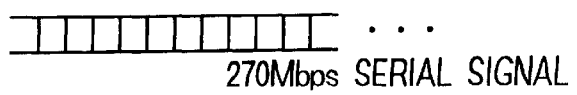

In the SDDI system, as shown in FIG. 2A, similar to the SDI system, 525 (625, below in the explanation of this portion, the content in parentheses indicates the case of a 625 line-configuration) lines constitute one frame. As shown in FIG. 2B, the transmission packet of the SDDI system is treated as 10 bits of data of a parallel format and a speed of 27 Mbps inside the data transmitting apparatus 10 and the data receiving apparatus 20. Four words from the head of each line are used as an end-of-active-video code EAV, the subsequent 276 words (268 words) are used as an ancillary data portion (ANC) storing the predetermined control data, the following 4 words are used as a start-of-active-video code SAV, and the following 1440 words are used as the payload portion (PAD) storing the noncompressed AV data, compressed AV data, or computer data. The transmission packet shown in FIG. 2B is transmitted as a transmission signal of a 1-bit serial format and a speed of 270 Mbps as shown in FIG. 2C.

Next, the constituent parts of the data transmitting apparatus 1 will be explained.

The data transmitting apparatus 10 of the data transmitting apparatus 1 first stores the input data VIN as the transmission data which is the object of transmission in the payload portion of the transmission packet of the SDDI system shown in FIG. 2B while maintaining the noncompressed state or after compressing and encoding the same by the inter-frame compression encoding system etc. Next, it stores the reproduction-use data indicating the method of reproduction when performing variable speed reproduction etc. on the reception side in the payload portion of the transmission packet corresponding to the predetermined line of the frame and transmits the same via the transmission channel to the data receiving apparatus 20. In the embodiment of the present invention, the reproduction-use data is transmitted stored in the 12th line of the frame.

In the data transmitting apparatus 10, the AV data processing apparatus 12 compresses and encodes for example the noncompressed AV data reproduced from the AV data storage device of a digital video tape recorder (digital VTR) or the input data VIN such as computer data, in accordance with an operation from the outside, by an inter-frame predictive encoding system of the MPEG (Moving Picture Expert Group) etc. or outputs this as it is to the SDDI encoder circuit 14 as the transmission data S12.

The reproduction-use data generation circuit 16 generates the write memory address and the read memory address according to the indication data indicating the variable speed reproduction input from the outside such as from a terminal (not illustrated) connected to the reproduction-use data generation circuit 16 by the operator of the data transmitting apparatus 1 and outputs the same to the SDDI encoder circuit 14.

Among these addresses generated by the reproduction-use data generation circuit 16, the write address indicates the storage region of the frame memory 28 storing the data of the frame in which the transmission packet is included. The read address indicates the storage region recording the data of the frame to be read out from the frame memory 28.

The SDDI encoder circuit 14 stores the storage write address and read memory address output from the reproduction-use data generation circuit 16 in the payload portion PAD of the transmission packet starting from the 12-th line of the frame shown in FIG. 2A and stores the transmission data S12 output from the AV data processing apparatus 12 in the payload portion PAD of the transmission packet starting from the 13th line of the frame shown in FIG. 2A. Further, the SDDI encoder circuit 14 outputs to the transmission circuit 18 a transmission packet storing predetermined transmission control data in the ancillary data portion ANC in the transmission packet of a predetermined line (same line as 12th of frame in which reproduction-use data is stored).

The transmission circuit 18 sequentially performs the parallel/serial conversion for the transmission packet input from the SDDI encoder circuit 14 as shown in FIG. 2C, generates the transmission signal, and transmits this to the transmission channel.

The data receiving apparatus 20 first separates the noncompressed AV data or the compressed AV data or other transmission data and the reproduction-use data from the SDDI transmission packet sent from the data transmitting apparatus 10, expands and decodes the compressed AV data when the transmission data is such, and performs variable speed reproduction of the AV data such as fast forward or slow motion based on the separated reproduction-use data.

In the data receiving apparatus 20, the reception circuit 22 receives the transmission packet transmitted through the transmission channel from the data transmitting apparatus 10, performs the serial/parallel conversion, and outputs the resultant data to the SDDI decoder 24.

The SDDI decoder 24 first separates the write memory address and the read memory address stored in the payload portion PAD of the transmission packet of the 12th line of the frame of the SDDI format received by the reception circuit 22 and outputs the same as the control signal C30 to the memory control circuit 30. Next, it separates the transmission control data stored in the ancillary data portion ANC in the transmission packet at the 12th line of the frame and outputs the same as the control signal C32 to the apparatus control circuit 32 and, further, separates the transmission data stored in the payload portion PAD of the transmission packet of each line starting from the 13th line and outputs the same as the transmission data S24 to the AV data processing circuit 26.

The apparatus control circuit 32 controls the operation of the constituent portions of the data receiving apparatus 20 based on the control signal C30.

The AV data processing circuit 26 expands and decodes the transmission data S24 input from the SDDI decoder 24 when the transmission data S26 is-compressed AV data, while outputs the same as it is to the frame memory 28 as the transmission data S26 when it is noncompressed AV data or computer data.

The memory control circuit 30 controls the frame memory 28 based on the control signal C30 using the control signal C28 and first stores the received transmission data S26 in the storage region of the frame memory 28 indicated by the write memory address separated by the SDDI decoder 24. Next, it outputs the data stored in the storage region indicated by the read memory address out of the transmission data S26 stored in the frame memory 28 as the output data VOUT.

In the frame memory 28, the storage region is divided into a plurality of regions corresponding to the frames, the transmission data S24 input from the AV data processing circuit 26 is sequentially stored in units of frames according to the control by the memory control circuit 30, and output as the output data VOUT. By adjusting the speed of writing and speed of reading data to and from the frame memory 28, ordinary reproduction or suitable variable speed reproduction is realized. That is, the write address and read address of the frame memory 28 given as the reproduction-use data at the transmission side define the reproduction speed.

Note that, where a plurality of data receiving apparatuses 20 are connected to the data transmission system to which the data transmitting apparatus 1 is applied, if the storage region of the frame memory 28 be used in common, then there would be no need for managing the addresses in the data transmission apparatus 10 for each data reception apparatus, resulting in more convenience.

Below, an explanation will be made of the operation of the data transmitting apparatus 1 by taking as an example a case where compressed AV data is transmitted from the data transmitting apparatus 10 to the data receiving apparatus 20 as the transmission data.

In the data transmitting apparatus 10, the AV data processing apparatus 12 compresses and encodes the noncompressed AV data by the inter-frame predictive encoding system.

Here, for AV data compressed and encoded by an inter-frame predictive encoding system such as that of the MPEG, the processing for expansion and decoding must be carried out in units called GOPs (groups of pictures). Accordingly, also in the data transmitting apparatus 1, the transmission data compressed and encoded by the AV data processing apparatus 12 must be handled in units of GOPs until the expansion and decoding are carried out by the AV data processing circuit 26 of the data receiving apparatus 20.

So as to satisfy this necessity, the reproduction-use data generation circuit 16 receives a timing signal for generation of the GOPs from the AV data processing apparatus 12 via the control signal C12 as indicated by a dotted line in FIG. 1 and generates the write memory address indicating the region for storing the transmission data in the frame memory 28 in synchronization with this timing signal. Further, it generates the read memory address based on the indication data indicating the variable speed reproduction and outputs the same to the SDDI encoder circuit 14.

An explanation will be made next of the operation of the reproduction-use data generation circuit 16 by showing a specific example. When the frame memory 28 is divided into storage regions 0 to p corresponding to the frames, the reproduction-use data generation circuit 16 generates write memory addresses circularly designating these addresses such as 0, 1, 2, . . . , p, 1, 2, 3, . . . for storing the data of the frames in the frame memory 28. Here, p is an integer.

Further, the reproduction-use data generation circuit 16 generates the reproduction memory addresses for realizing variable speed reproduction. For example, in the case of ordinary speed reproduction, in the same way as the write memory addresses, it circularly generates addresses such as the storage regions 0, 1, 2, . . . , p, 0, 1, 2, 3, . . . . In the case of two-speed reproduction, it generates read memory addresses to skip every other storage region such as the storage regions 0, 2, 4, . . . 2q, 0, 2, 4, . . . or the storage regions 1, 3, 5, . . . , (2q−1), 1, 3, . . . . Here, q is an integer and in this example p=2q. Further, in the case or reverse reproduction, for example, it generates read memory addresses designating the addresses in the order of p, p−1, . . . 1, 0, p, . . . , while in the case of reproduction in the reverse direction at a two-times slower speed, it generates the read memory addresses designating the addresses in the order of 0, 0, 1, 1, . . . , p, p0, 0, . . . .

The write memory address and the read memory address generated by the reproduction-use data generation circuit 16 are generated and utilized independently. For example, when the transmission data is compressed AV data, the transmission data is received by the receiving apparatus, then decoded and expanded and stored in the storage region designated by the write memory address transmitted simultaneously by the same transmission packet. In this case, since the transmission data is decoded and expanded, it takes several frames' worth of time for example before it is stored in the frame memory and can be read out. Accordingly, the read address should be generated, stored in the transmission packet, and transmitted after a time anticipating the time for the decoding and expansion.

Since the read memory address can be generated and transmitted independently of the write memory address, it is no longer necessary to read the data of the frame from the frame memory after waiting for the compressed AV data to be decoded and expanded.

When the transmission data is noncompressed AV data and computer data, the decoding and expansion are unnecessary, so it is sufficient to generate and transmit as the read memory address the address where the data of the frame desired to be read from the frame memory is stored at the time when the transmission packet is received by the receiving apparatus.

The method of generation of the read memory address by the reproduction-use data generation circuit 16 is the same also in the case where the data receiving apparatus 20 is made to reproduce the AV data in the forward direction further faster, a case where it is made to perform the reproduction in the reverse direction further faster, a case where it is made to perform frame-feed reproduction, it is made to perform still reproduction, etc.

The SDDI encoder circuit 14 stores the write memory address and the read memory address output from the reproduction-use data generation circuit 16 in the payload portion PAD of the transmission packet of the 12th line of the frame of the SDDI system. Further, it stores the transmission data S12 output from the AV data processing apparatus 12 in the payload portion PAD of each line from the 13th line. The transmission circuit 18 sequentially transmits the transmission packet output from the SDDI encoder circuit 14 to the transmission channel.

In the data receiving apparatus 20, the reception circuit 22 receives the transmission packet sent from the data transmitting apparatus 10.

Figure 3:
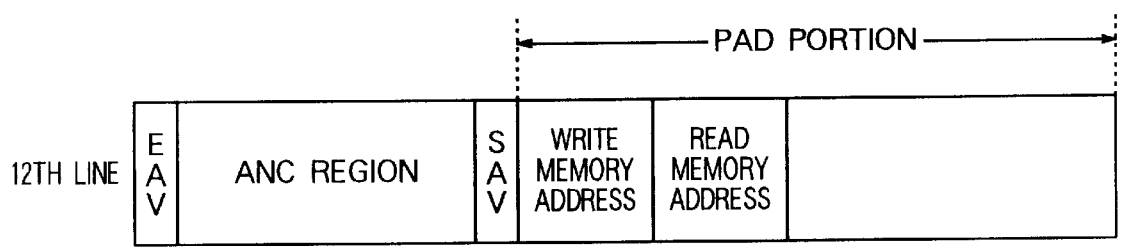
FIG. 3 is a view of the content of the reproduction-use data included in the payload portion of the transmission packet of the 12-th line of a frame of the SDDI system shown in FIG. 2A to FIG. 2C.

The SDDI decoder 24 separates the write memory address and the read memory address from the payload portion PAD of the transmission packet of the 12th line of the SDDI system shown in FIG. 3 and separates the transmission data from the payload portion PAD of the transmission packet of each line from the 12th line.

The AV data processing circuit 26 expands and decodes the transmission data S24.

The memory control circuit 30 uses the frame signal C28 to control the frame memory 28 to make it sequentially store the AV data (transmission data S26) expanded and decoded by the AV data processing circuit 26 in the storage region of the frame memory 28 indicated by the write memory address and, at the same time, make it output the data of the frame stored in the storage region of the frame memory 28 indicated by the read memory address as the output data VOUT.

By configuring the data transmitting apparatus 1 as explained above, it becomes possible to instruct the method of variable speed reproduction at the data receiving apparatus 20 from the data transmitting apparatus 10 side.

Further, since a transmission packet of the SDDI system can include in one payload a plurality of series of compressed AV data etc., it is possible to simultaneously perform control for variable speed reproduction for a plurality of series of AV data.

Note that, in the first embodiment, the operation of the data transmitting apparatus 1 was explained with reference to a case where compressed AV data is used as the transmission data, but the same is true also for the case where noncompressed AV data is used as the transmission data.

Further, it is also possible to configure the data transmitting apparatus 1 so as to transmit the data for giving a special effect to for example the transmission data, data necessary for expanding and decoding the transmission data, data used for editing the AV data, etc. as the reproduction-use data.

Note that, it is also possible to configure the frame memory 28 by a hard disc (HDD) device, magneto-optic (MO) disc device, etc. in addition to a semiconductor memory.

Further, in the data transmitting apparatus 1, it is preferred to transmit from the data transmitting apparatus 10 to the data receiving apparatus 20 all frames included in the AV data irrespective of whether or not the variable speed reproduction should be carried out. This is because variable speed reproduction of any speed becomes possible only by a change of the reproduction-use data. Note, for certain purposes of the data transmitting apparatus 1, it is also possible to configure the apparatus so as to transmit only the data necessary for the variable speed reproduction at the time of variable speed reproduction.

Second Embodiment

Below, an explanation will be made of a second embodiment of the present invention.

Figure 4:
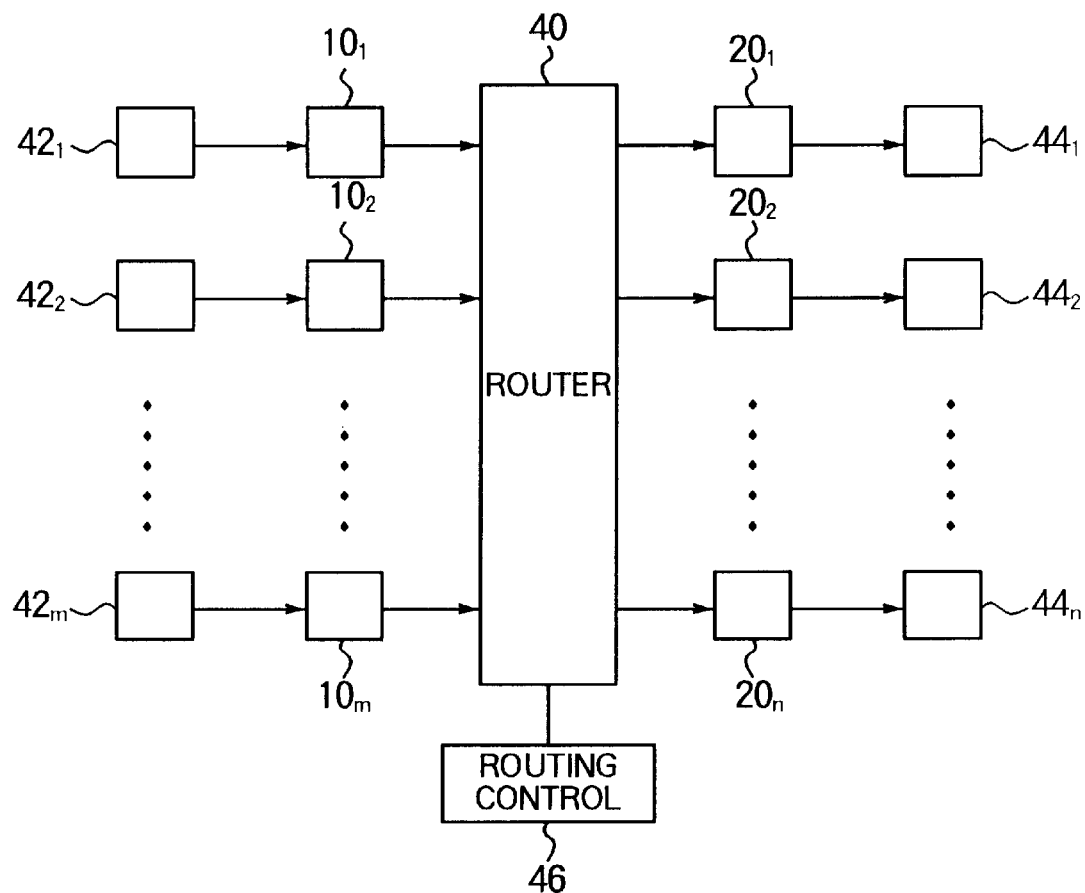
FIG. 4 is a view of the configuration of a data transmission system having a plurality of data transmitting apparatuses and data receiving apparatuses shown in FIG. 1.

FIG. 4 is a view of the configuration of a data transmission system 4 having a plurality of data transmitting apparatuses 10 and data receiving apparatuses 20 shown in FIG. 1. Note that, among the constituent elements of the data transmission system 4 shown in FIG. 4, elements the same as the constituent portions of the data transmitting apparatus 1 shown in FIG. 1 are indicated by the same references.

As shown in FIG. 4, the data transmission system 4 is configured by m number of data transmitting apparatuses $10_1$ to $10_m$, data generation devices $42_1$ to $42_m$ such as digital VTR devices, image processing devices, and computers connected to each of the data transmitting apparatuses $10_1$ to $10_m$, n number of data receiving apparatuses $20_1$ to $20_n$, video equipment $44_1$ to $44_n$ such as monitor devices individually connected to the n number of data receiving apparatuses $20_1$ to $20_n$, a router device 40 for connecting between any of the data transmitting apparatuses $10_1$ to $10_m$ and any of the data receiving apparatuses $20_1$ to $20_n$ (m and n are integers) in a one-to-one or one-to-many correspondence, and a routing control device 46 controlling the connections of the router device 40.

As shown in FIG. 4, the data transmitting apparatuses $10_1$ to $10_m$ are provided in a one-to-one correspondence with respect to the data generation devices $42_1$ to $42_m$ generating the AV data etc. The data transmitting apparatuses $10_1$ to $10_m$ and the data receiving apparatuses $20_1$ to $20_n$ are connected by the router device 40, whereby it is possible to perform variable speed reproduction etc. for the transmission signal transmitted by any of the data transmitting apparatuses $10_1$ to $10_m$ by one or more data receiving apparatuses among $20_1$ to $20_n$. Note that, in this case, as mentioned in the first embodiment, it is preferred if the addresses for designating the storage regions of the frame memory 28 of the data transmitting apparatuses $10_1$ to $10_m$ be commonly used by all frame memories 28.

The present invention is not limited to the specific configurations and processing explained above and can be modified in various ways.

As mentioned above, according to the data transmitting apparatus according to the present invention, the AV data or other transmission data which is the object of the transmission and the reproduction-use data which becomes necessary for the reproduction processing of the transmission data can be transmitted while being included in the same transmission packet using the same transmission channel.

Further, according to the data transmitting apparatus according to the present invention, by enabling the transmission of the transmission data and the reproduction-use data included in the same transmission packet, these data can be transmitted by using the same equipment. Therefore the wiring when installing the data transmitting apparatus according to the present invention can be reduced and the construction work at the time of installation becomes easy.

Furthermore, according to the present invention, by enabling the transmission of the transmission data and the reproduction-use data included in the same transmission packet, synchronization can be easily established between the data.

Note that while the explanation was made regarding variable speed reproduction in the above embodiments, the invention is not limited to variable speed reproduction. It can simultaneously store and can transmit by package the transmission data and command data for its processing using the format of the SDDI system.

Industrial Applicability

The data transmitting apparatus of the present invention can be used for transmission of digital data in various fields.

What is claimed is:

1. A SDDI data transmitting/receiving system for transmitting SDDI transmission data including a transmission packet having a control portion including at least data for reproduction control indicating at least one of a plurality of modes of reproduction to a receiving side and a data portion including transmission data from a transmitting apparatus to a receiving apparatus where said transmission data is reproduced according to a particular one of said modes of reproduction determined at a transmission side, wherein
said transmitting apparatus comprises:
reproduction-use data generating means for generating reproduction-use data by selecting one or more addresses indicative of a selected portion or portions of the transmission data to be reproduced on said receiving side such that the selected portion or portions when reproduced by said receiving apparatus in accordance with the selected addresses causes said selected portion or portions to be reproduced in accordance with said particular one of said modes of reproduction, thereby determining on the transmission side the mode of reproduction for reproducing said transmission data on said receiving side;
data storing means for storing the reproduction-use data and the transmission data in the transmission packet; and
transmitting means for transmitting the transmission packet storing the reproduction-use data and the transmission data to the receiving apparatus;
said receiving apparatus comprises:
receiving means for receiving the transmission packet transmitted by the transmitting apparatus;
data separating means for separating the reproduction-use data and the transmission data from the received transmission packet; and
data reproducing means for reproducing the selected portion or portions of the transmission data in accordance with the received address or addresses included in the reproduction-use data.

2. A data transmitting/receiving system as set forth in claim 1, wherein the data reproducing means of the receiving means comprises:
a memory controlling device and
memory means for storing the transmission data separated by the data separating means and outputting the stored transmission data at the control of the memory controlling device.

3. A data transmitting/receiving system as set forth in claim 2, wherein the reproduction-use data generating means of the transmitting apparatus generates the reproduction-use data indicating the address or addresses of the memory means in which the transmission data is stored and from which the stored transmission data is outputted.

4. A data transmitting/receiving system as set forth in claim 3, wherein the memory controlling device of the data reproducing means of the receiving apparatus sequentially stores the transmission data separated by the data separating means in the memory means at the address or addresses indicated by the reproduction-use data separated by the data separating means and outputs the transmission data stored in the memory means indicated by the reproduction-use data separated by the data separating means.

5. A data transmitting/receiving system as set forth in claim 1, wherein the transmission data is audio data and/or video data.

6. A data transmitting/receiving system as set forth in claim 1, wherein the mode of reproduction includes ordinary speed reproduction and variable speed reproduction modes wherein the address or addresses of the reproduction-use data corresponds to an ordinary speed reproduction for said ordinary speed reproduction mode or variable speed reproduction for said variable speed reproduction mode of the transmission data.

7. A data transmitting/receiving system as set forth in claim 6, wherein the data reproducing means of the receiving apparatus includes memory means for storing the transmission data and outputting the stored transmission data and wherein the reproduction-use data generated by said reproduction-use data generating means is comprised of a write memory address or addresses indicating where the transmission data is to be stored in the memory means and a read memory address or addresses indicative of a storage region or regions in the memory means from where the stored transmission data is to be output.

8. A data transmitting/receiving system as set forth in claim 5, wherein the video data of the transmission data is compressed and encoded video data.

9. A data transmitting/receiving system as set forth in claim 8, wherein the data storing means includes compressing and encoding means for compressing and encoding the noncompressed transmission data.

10. A data transmitting/receiving system as set forth in claim 4, wherein said reproduction-use data is comprised of an ancillary portion and payload portion in a first direction, in which said ancillary portion and said payload portion are stored in a predetermined line of a format of data comprised of a plurality of lines in a second direction;

said transmission data is stored in the payload portion of a line starting from the line where the reproduction-use data is stored; and the reproduction-use data and transmission data are transmitted in packets.

11. A SDDI transmitting apparatus for transmitting SDDI transmission data including a transmission packet having a control portion including at least data for reproduction control indicating at least one of a plurality of modes of operation to a receiving side and a data portion including transmission data to a receiver where said transmission data is reproduced according to a particular one of said modes of reproduction determined at a transmission side, wherein said transmitting apparatus comprises:

reproduction-use data generating means for generating reproduction-use data by selecting one or more addresses indicative of selected portion or portions of the transmission data to be reproduced on said receiving side such that the selected portion or portions when reproduced by said receiver in accordance with the selected addresses causes said selected portion or portions to be reproduced in accordance with said particular one of said modes of reproduction, thereby determining on the transmission side the mode of reproduction for reproducing said transmission data on said receiving side;

data storing means for storing the reproduction-use data and the transmission data in the transmission packet; and transmitting means for transmitting the transmission packet storing the reproduction-use data and the transmission data to the receiving apparatus.

12. A SDDI receiving apparatus for receiving SDDI transmission data including a transmission packet having a control portion including at least reproduction-use data for reproduction control indicating at least one of a plurality of modes of reproduction to a receiving side and a data portion including the transmission data from a transmitting apparatus and for reproducing said transmission data according to a particular one of said modes of reproduction determined at a transmission side, said reproduction-use data including one ore more addresses selected by said transmitting apparatus indicative of selected portion or portions such that when reproduced by said receiver in accordance with the selected addresses causes said selected portion or portions to be reproduced in accordance with said particular one of said modes of reproduction, wherein said receiving apparatus comprising:

receiving means for receiving the transmission packet with said reproduction-use data;

data separating means for separating from the received transmission packet the reproduction-use data and the transmission data; and data reproducing means for reproducing transmission data based on said reproduction-use data;

said data reproducing means of said receiving apparatus comprising:

memory controlling means; and memory means for storing the transmission data separated by said data separating means and outputting the stored transmission data at the control of said memory controlling means;

said memory controlling means of said receiving apparatus sequentially stores the transmission data separated by said data separating means in a storage region in said memory means indicated by said reproduction-use data separated by said data separating means and outputs the transmission data stored in a storage region in said memory means indicated by said reproduction-use data separated by said data separating means.

13. A SDDI transmitting apparatus for transmitting SDDI transmission data including a transmission packet having a control portion including at least data for reproduction control indicating at least one of a plurality of modes of reproduction to a receiving side and a data portion including the transmission data to a receiving apparatus over a transmission channel where said transmission data is reproduced according to said mode of reproduction determined at a transmission side, wherein said transmitting apparatus comprising:

reproduction-use data generating means for generating reproduction-use data by selecting one or more addresses indicative of selected portion or portions of the transmission data to be reproduced on said receiving side such that the selected portion or portions when reproduced by said receiving apparatus in accordance with the selected addresses causes said selected portion or portions to be reproduced in accordance with said Particular one of said modes of reproduction;

data storing means for storing the reproduction-use data and the transmission data in the transmission packet; and transmitting means for transmitting the transmission packet storing the reproduction-use data and the transmission data to the receiving apparatus;

said receiving apparatus comprising:

receiving means for receiving the transmission packet transmitted by the transmitting apparatus;

data separating means for separating the reproduction-use data and the transmission data from the received transmission packet; and data reproducing means for reproducing the transmission data in accordance with the received addresses included in reproduction-use data;

the video data of said transmission data is compressed and encoded video data;

wherein the reproduction-use data generating means of the transmitting apparatus generates the reproduction-use data indicating storage regions of memory in which the transmission data is stored in the receiving apparatus and storage regions in memory of the transmission data to be output from the memory of the receiving means;

wherein the data reproducing means of said receiving apparatus comprises memory controlling means and memory means for storing the transmission data separated by said data separating means and outputting the stored transmission data at the control of said memory controlling means;

said memory controlling means of the data reproducing means of said receiving apparatus sequentially stores the transmission data separated by said data separating means in a storage region in said memory means indicated by said reproduction-use data separated by said data separating means and outputs the transmission data stored in said storage region in said memory means indicated by said reproduction-use data separated by said data separating means.

14. A data transmitting apparatus as set forth in claim 13, wherein the transmission data is audio data and/or video data.

15. A data transmitting apparatus as set forth in claim 14, wherein the reproduction-use data includes one or more said addresses corresponding to an ordinary speed reproduction or variable speed reproduction of the transmission data; and the reproduction-use data generated by said reproduction-use data generating means is comprised of a write memory address of the storage region in the memory means where the transmission data is stored and a read memory address of the storage region in the memory means of the transmission data to be output from the memory means.

16. A data transmitting apparatus as set forth in claim 15, wherein the data storing means include compressing and encoding means for compressing and encoding the noncompressed transmission data.

17. A data transmitting apparatus as set forth in claim 14, wherein said reproduction-use data is comprised of an ancillary portion and payload portion in a first direction, which ancillary portion and payload portion are stored in a predetermined line of a format of data comprised of a plurality of lines, said transmission data is stored in the payload portion of the next line where the reproduction-use data is stored.

18. A data transmitting/receiving system as set forth in claim 1, wherein said data storing means stores said reproduction-use data on the 12th line of a frame of video data to be transmitted.

19. A data transmitting/receiving system as set forth in claim 1, wherein said transmitting apparatus comprises a plurality of transmitters each having said reproduction-use data generating means, said data storing means and said transmitting means; and said receiving apparatus comprising a plurality of receivers each comprising said receiving means, said data separating means and said data reproducing means; further comprising routing means for routing said transmission packet from a respective transmitter to a respective receiver.

20. A data transmitting/receiving system as set forth in claim 6, wherein said reproduction-use data generating means generates said reproduction-use data including one or more said addresses of said transmission data to be reproduced in said variable speed mode which skip storage regions of the stored transmission data in the receiving apparatus.

21. A data transmitting/receiving system as set forth in claim 7, wherein said read memory addresses are transmitted after a predetermined time necessary for decoding said transmission data.

22. The system according to claim 1, wherein said plurality of modes of reproduction include an ordinary mode of reproduction and a special mode of reproduction, wherein said reproduction-use data generating means selects addresses for all portions of said transmission data to determine said ordinary mode of operation on said transmission side and selects a portion of said addresses of said portion or portions of said transmission data to determine said special mode of reproduction.

23. The apparatus according to claim 11, wherein said plurality of modes of reproduction include an ordinary mode of reproduction and a special mode of reproduction, wherein said reproduction-use data generating means selects addresses for all portions of said transmission data to determine said ordinary mode of operation on said transmission side and selects a portion of said addresses of said portion or portions of said transmission data to determine said special mode of reproduction.

24. The apparatus according to claim 12, wherein said plurality of modes of reproduction include an ordinary mode of reproduction and a special mode of reproduction, wherein said reproduction-use data generating means selects addresses for all portions of said transmission data to determine said ordinary mode of operation on said transmission side and selects a portion of said addresses of said portion or portions of said transmission data to determine said special mode of reproduction.

25. The apparatus according to claim 13, wherein said plurality of modes of reproduction include an ordinary mode of reproduction and a special mode of reproduction, wherein said reproduction-use data generating means selects addresses for all portions of said transmission data to determine said ordinary mode of operation on said transmission side and selects a portion of said addresses of said portion or portions of said transmission data to determine said special mode of reproduction.

* * * * *